United States Patent [19]
Matsumoto et al.

[11] Patent Number: 5,274,463
[45] Date of Patent: Dec. 28, 1993

[54] STILL PICTURE STORING AND SEQUENCING APPARATUS

[75] Inventors: Akihiko Matsumoto; Yousuke Seki, both of Kanagawa, Japan

[73] Assignee: Sony Corporation, Tokyo, Japan

[21] Appl. No.: 673,781

[22] Filed: Mar. 22, 1991

[30] Foreign Application Priority Data

| Mar. 27, 1990 | [JP] | Japan | 2-077423 |
| Mar. 27, 1990 | [JP] | Japan | 2-077425 |
| Mar. 27, 1990 | [JP] | Japan | 2-077426 |
| Mar. 27, 1990 | [JP] | Japan | 2-077428 |

[51] Int. Cl.$^5$ .................... H04N 5/76; H04N 5/781
[52] U.S. Cl. .................... 358/335; 358/342; 360/14.1; 360/14.3
[58] Field of Search ............ 358/335, 342, 310, 84, 358/85, 86, 185, 311; 360/33.1, 35.1, 14.1, 14.2, 14.3; 369/54, 47, 58

[56] References Cited

U.S. PATENT DOCUMENTS

| 4,264,925 | 4/1981 | Freman et al. | 358/86 |
| 4,616,263 | 10/1986 | Eichelberger | 358/86 |
| 4,787,085 | 11/1988 | Suto et al. | 358/86 |
| 4,871,903 | 10/1989 | Carrell | 369/54 |
| 4,888,648 | 12/1989 | Takeuchi et al. | 358/335 |
| 4,896,209 | 1/1990 | Matsuzaki et al. | 358/86 |
| 4,935,924 | 6/1990 | Baxter | 358/86 |
| 4,949,187 | 8/1990 | Cohen | 358/86 |
| 4,967,273 | 10/1990 | Greenberg | 358/84 |
| 4,999,709 | 3/1991 | Yamazaki et al. | 358/160 |
| 5,060,068 | 10/1991 | Lindstrom | 358/86 |
| 5,122,886 | 6/1992 | Tanaka | 358/335 |

FOREIGN PATENT DOCUMENTS

0187073 11/1985 European Pat. Off. .
0410579 6/1990 European Pat. Off. .
3341363 11/1983 Fed. Rep. of Germany .

OTHER PUBLICATIONS

Japanese Patent Laid-Open Nos. Hei 2 (1990)-285867.
Japanese Patent Laid-Open Nos. Hei 2(1990)-285868.

*Primary Examiner*—Tommy Chin
*Assistant Examiner*—Thai Tran
*Attorney, Agent, or Firm*—Philip M. Shaw, Jr.

[57] ABSTRACT

A still picture filing apparatus comprising still picture preparation circuit for preparing a plurality of still pictures and adding identification data to each of such still pictures; still picture memory for storing the plural still pictures with the identification data added thereto respectively; still-picture transmission data preparation circuit for preparing still-picture transmission data indicative of a still picture transmission sequence in accordance with the identification data; transmission command signal generation circuit for generating a transmission command signal to instruct transmission of the still pictures; and a controller responsive to the transmission command signal outputted from the transmission command signal generation circuit and reading out the still pictures from the still picture memory in conformity to the transmission sequence indicated by the still-picture transmission data obtained from the still-picture transmission data preparation circuit.

10 Claims, 6 Drawing Sheets

STILL PICTURE STORING AND SEQUENCING APPARATUS

BACKGROUND OF THE INVENTION

1. Field of the Invention

The present invention relates to a still picture filing apparatus adapted to file a plurality of still pictures, and more particularly to an apparatus equipped with means for setting a sequence of reading a plurality of filed still pictures.

2. Description of the Prior Art

In a news program, it is generally customary that still pictures such as photographs relative to the news and a commentary board or the like are transmitted in addition to motion pictures of a newscaster, a commentator and so forth picked up by a television camera and also motion pictures of event scenes recorded by a video tape recorder (VTR), thereby enabling television viewers to easily understand the contents of the news.

There are known exemplary still picture filing apparatus capable of preparing and filing such a still picture, then reading out and transmitting the same at a desired timing, as disclosed in Japanese Patent Laid-open Nos. Hei 2 (1990)-285867 and Hei 2 (1990)-285868.

In the above still picture filing apparatus, still picture information of a photograph or the like is picked up by a television camera to obtain an input video signal, then character data for a commentary or the like is superimposed on one frame of such input video signal, and further predetermined identification data is added thereto to prepare a still picture.

The still picture thus prepared is filed in a large-capacity memory consisting of a magneto-optical disk unit for example, whereby a still picture file is formed on a magneto-optical disk.

The still picture file on the magneto-optical disk is read out therefrom at a predetermined timing and then is transmitted as a still picture to be used in a news program.

And the timing to transmit each still picture in such news program is controlled in accordance with a play list prepared separately by designating the transmission sequence, the transmission time and the presence or absence of any special effect with regard to a plurality of still picture files stored on magneto-optical disks.

In the still picture filing apparatus of such a constitution, it is necessary that still picture files have already been stored on a magneto-optical disk when preparing a play list which indicates the transmission sequence and so forth of a plurality of still pictures.

Consequently there exists a drawback that a long operation time is required, since it is impossible to perform simultaneous parallel preparation of both still picture files and a play list.

The known still picture filing apparatus mentioned above incorporates a magneto-optical disk unit therein, so that when the still picture filing apparatus is installed in any place other than a news program preparation site, such as a machine room for example, then some intricate labor is required at the time of replacing the magneto-optical disk or the like to consequently raise a problem of impeding the portability of the magneto-optical disk.

OBJECTS AND SUMMARY OF THE INVENTION

It is a primary object of the present invention to provide an improved still picture filing apparatus which is capable of performing parallel preparation of still pictures and a list indicative of a still-picture transmission sequence.

Another object of the present invention is to provide an improved still picture filing apparatus adequate to attain abundant extendability of a filing system.

And a further object of the present invention resides in providing an improved still picture filing apparatus adapted to transfer still pictures between two mutually distant sites For the purpose of achieving the primary object mentioned, the still picture filing apparatus of the present invention comprises still picture preparation means for preparing a plurality of desired still pictures and adding identification data to each of such still pictures; still picture memory means for storing the plural still pictures with the identification data added thereto respectively; still-picture transmission data preparation means for preparing still-picture transmission data indicative of a still picture transmission sequence in conformity with the identification data; transmission command signal generation means for generating a transmission command signal to instruct transmission of the still pictures; and control means responsive to the transmission command signal outputted from the transmission command signal generation means and reading out the still pictures from the still picture memory means in conformity with the transmission sequence indicated by the still-picture transmission data obtained from the still-picture transmission data preparation means.

For the purpose of achieving another object mentioned, the present invention comprises first and second still picture preparation means for preparing a plurality of still pictures and adding identification data to such still pictures respectively; first and second still picture memory means for storing the plural still pictures with the identification data added thereto respectively; first and second still-picture transmission data preparation means each for preparing still-picture transmission data indicative of a still picture transmission sequence in conformity with the identification data; first and second transmission command signal generation means each for generating a transmission command signal to instruct transmission of the still pictures; and first and second control means connected mutually in a manner to respond to the transmission command signals outputted respectively from the first and second transmission command signal generation means, and reading out the still pictures from the first or second still picture memory means in conformity with the transmission sequence indicated by the still-picture transmission data obtained from the first and second still-picture transmission data preparation means.

For the purpose of achieving the further object mentioned, the present invention comprises first and second still picture preparation means for preparing a plurality of still pictures and adding identification data to such still pictures respectively; first and second still picture memory means for storing the plural still pictures with the identification data added thereto respectively; first and second still-picture transmission data preparation means each for preparing still-picture transmission data indicative of a still picture transmission sequence in conformity with the identification data; first and second transmission command signal generation means each for generating a transmission command signal to instruct transmission of the still pictures; and first and second control means connected mutually via a wire or wireless communication network in a manner to respond to the transmission command signals outputted respectively from the first and second transmission command signal generation means, and reading out the still pictures from the first or second still picture memory means in conformity with the transmission sequence indicated by the still-picture transmission data obtained from the first and second still-picture transmission data preparation means.

The above and other objects, features and advantages of the present invention will become apparent from the following description which will be given with reference to the illustrative accompanying drawings.

DESCRIPTION OF THE PREFERRED EMBODIMENTS

Hereinafter an exemplary embodiment of the present invention will be described in detail with reference to the accompanying drawings.

Figure 1:
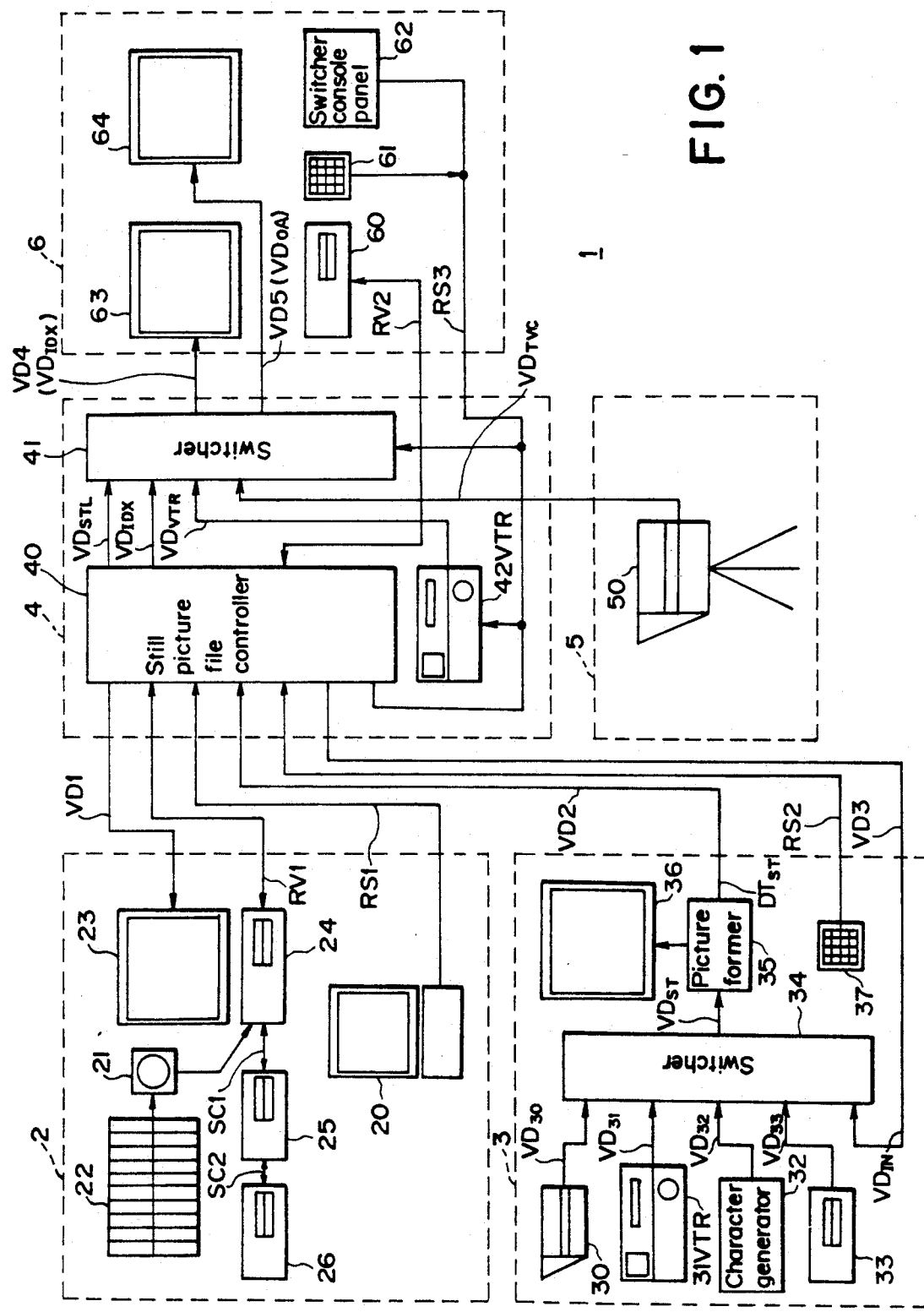
FIG. 1 is a block diagram showing a first embodiment of the still picture filing apparatus of the present invention.

FIG. 1 shows the entire constitution of a still picture filing apparatus 1 used in a news program broadcasting site, wherein required broadcasting equipments are installed in a director room 2, a still picture preparation room 3, a machine room 4, a studio 5 and a program control room 6.

More specifically, in the director room 2 are installed a work station 20 for transmitting and receiving control commands and for preparing a play list, a library 22 for magneto-optical disks 21 where still picture files are stored, a monitor 23 for displaying a still picture or the like, and three magneto-optical disk units 24, 25 and 26.

In this embodiment, the work station 20 is connected to a still picture file controller 40 in the machine room 4 via a signal line RS-1 based on the RS-422 interface standard, and is capable of transmitting and receiving a control command and a prepared play list.

The first magneto-optical disk unit 24 out of the three units 24, 25 and 26 is connected to the still picture file controller 40 via a signal line based on the RS-422 interface standard and also via a coaxial cable RV1, and is capable of transmitting and receiving a control command through the signal line and also a digital component video signal of the SMPTE D-1 format through the coaxial cable.

In addition to the above, the first magneto-optical disk unit 24 has extension buses SC1 and SC2 based on the SCSI (small computer system interface) standard, and the second and third magneto-optical disk units 25 and 26 are cascade-connected to the first disk unit via such extension buses SC1 and SC2.

The monitor 23 is connected to the still picture file controller 40 via a coaxial cable VD1 and receives an analog video signal from the still picture file controller 40.

In the still picture preparation room 3 are installed video appliances for inputting still picture information, such as a television camera 30, a video tape recorder (VTR) 31, a character generator 32 and a magneto-optical disk unit 33.

In addition, there are also installed a video switcher 34 for selectively switching video signals $VD_{30}$, $VD_{31}$, $VD_{32}$, $VD_{33}$ transmitted from the video appliances 30-33 respectively and an input video signal $VD_{IN}$ from an external source; a picture former 35 for forming a desired still picture from the video signal $VD_{ST}$ selected by the switcher 34; a monitor 36; and a command transmission controller 37.

The picture former 35 consists of a microcomputer including a CPU (central processing unit) with command input devices such as a keyboard, a mouse and so forth. The picture former 35 extracts one frame of the input video signal $VD_{ST}$ as a still picture in response to manipulation of the keyboard or the mouse while displaying the input video signal $VD_{ST}$ on the monitor 36, and adds character information or the like to the still picture by controlling the character generator 32 to thereby prepare required still picture data.

The still picture data thus prepared is filed, together with predetermined identification data, on a desired magneto-optical disk by driving the command transmission controller 37.

In this embodiment, the picture former 35 is connected to the still picture file controller 40 in the machine room 4 via a coaxial cable VD1 so as to transmit an analog video signal therethrough.

The command transmission controller 37 is connected to the still picture file controller 40 via a signal line RS2 based on the RS-422 interface standard and is capable of transmitting and receiving a control command.

Meanwhile the video switcher 34 is connected to the still picture file controller 40 via a coaxial cable VD3 and receives an analog video signal $VD_{IN}$ therethrough.

In the program control room 6, there are installed a magneto-optical disk unit 60 for driving a magneto-optical disk where a still picture file is stored, a command input controller 61 for reading out and transmitting the filed still picture, a switcher console panel 62 for controlling the switcher 41 in the machine room 4, a still picture monitor 63 with an index screen for displaying thereon a plurality of size-reduced still pictures to be transmitted in accordance with a play list, and an on-air monitor 64 for monitoring the broadcast television signals to be transmitted practically as a news program.

In this embodiment, the magneto-optical disk unit 60 is connected to the still picture file controller 40 in the machine room 4 via a signal line based on the RS-422 interface standard and also via a coaxial cable RV2, and serves to transmit and receive a control command through such signal line and further to transmit and receive a digital component video signal of the SMPTE D-1 format through the coaxial cable.

The controller 61 and the switcher 62 are connected to the still picture file controller 40, the switcher 41 and the VTR 42 in the machine room 4 via a signal line RS3 based on the RS-422 interface standard and are capable of transmitting and receiving a control command therethrough.

Further the still picture monitor 63 and the on-air monitor 64 are connected to the switcher 41 in the machine room 4 via coaxial cables VD4, VD5 and receive an analog video signal.

In the machine room 4 are installed the aforementioned still picture file controller 40, switcher 41 and VTR 42. The switcher 41 receives all of a still-picture sends video signal $VD_{STL}$ and a still-picture index video signal $VD_{IDX}$ outputted from the still picture file controller 40, a VTR playback video signal $VD_{VTR}$ outputted from the VTR 42, and a television camera video signal $VD_{TVC}$ outputted from the television camera 50 installed in the studio 5.

In response to the control command obtained from the controller 61 and the switcher console panel 62 in the program control room 6, the switcher 41 selects the still-picture send video signal $VD_{STL}$, the VTR playback video signal $VD_{VTR}$ and the television camera video signal $VD_{TVC}$ to thereby form a broadcast television signal $VD_{OA}$ to be televised as a news program and then transmits such signal to a broadcasting equipment (not shown) while supplying the same signal also to the on-air monitor 64.

The switcher 41 further supplies to the still picture monitor 63 the still-picture index video signal $VD_{IDX}$ which is renewed at the transmission of each still picture.

In practice the still picture file controller 40 consists of a microcomputer including, in addition to a CPU (central processing unit) and an ordinary internal CPU bus, a video bus through which a digital component video signal of the SMPTE D-1 format is transmitted and received in a real time operation.

The video bus of the still picture file controller 40 is furnished with a connector for a coaxial cable and a connector for a signal line based on the RS-422 interface standard, and there are connected an interface board (hereinafter referred to as MOI/F board) for the magneto-optical disk unit having a frame memory to store one frame of the video signal, and also another interface board (hereinafter referred to as IOI/F board) for inputting and outputting both the video signal and the control command.

The MOI/F board and the IOI/F board incorporate a common protocol, so that the controllers 37, 61 and the monitor 23 connected to the IOI/F board are directly coupled to the magneto-optical disk units 24 and 60 which are connected to the MOI/F board. Therefore, when read commands are inputted by operating the controllers 37 and 61, desired still pictures are read out from the still picture files stored on the magneto-optical disks loaded in the magneto-optical disk units 24 and 60 and then are displayed on the monitor 23 and so forth.

In this stage, the still picture file controller 40 functions to control the operations of preparing, switching, reading and transmitting the still picture in response to the commands obtained from the controllers 17, 61 and so forth.

For preparing required still pictures, which represent the contents of a news program, in the still picture filing apparatus of the constitution mentioned, a director in charge of producing the news program first places an order to the still picture preparation room 3 together with a disk ID composed of identification data of one of the magneto-optical disks 21 which will be used for storing the still pictures and also a picture ID composed of identification data of the still pictures to be prepared.

Thereafter the director manipulates the work station 20 in the director room 2 and prepares a play list by designating the transmission sequence of the ordered still pictures, picture switching modes inclusive of a wipe, a dissolve and so forth, and also switching times thereof in accordance with the news program broadcasting sequence and method.

In conformity to the contents of the still pictures designated by the director, an operator in charge of forming still pictures in the still picture preparation room 3 controls the switcher 34 for selectively supplying to the picture former 35 a television camera video signal $VD_{30}$ obtained by picking up a photograph or the like by the television camera 30, a playback video signal $VD_{31}$ obtained by playing back a video tape by the VTR 31, a playback video signal $VD_{33}$ obtained by playing back a magneto-optical disk by the disk unit 33, or an external video input $VD_{IN}$ obtained from an external source.

Consequently the video signal $VD_{ST}$ inputted to the picture former 35 is displayed on the monitor 36, and the still picture preparation operator extracts the video signal $VD_{ST}$ at the desired still picture position while visually confirming the displayed signal on the monitor screen, whereby the desired still picture is displayed on the monitor 36.

In this state, the still picture preparation operator controls the character generator 32 by manipulating the keyboard or the mouse to thereby generate character data such as an explanation for the still picture displayed on the monitor 36. Subsequently such character data is superimposed on the still picture to produce the still picture data $DT_{ST}$, which is then displayed on the monitor 36.

When the still picture preparation operator decides that the still picture data $DT_{ST}$ displayed on the monitor 36 conforms to the instruction from the director, the disk ID and the picture ID designated by the director are added to the still picture data $DT_{ST}$, which is then transmitted to the still picture file controller 40 by means of the controller 37.

The still picture file controller 40 supplies a command at predetermined time interval to a plurality of magneto-optical disk units 24 and 60 connected to the MOI/F board, so as to confirm the disk ID of the loaded magneto-optical disks, whereby the disk ID of the magneto-optical disks loaded in the disk units 24, 60 can be detected.

In this embodiment, the second and third magneto-optical disk units 25 and 26 connected to the first magneto-optical disk unit 24 via the SCSI extension buses SC1 and SC2 are so disposed that the disk ID of the magneto-optical disks always loaded therein are kept under control from the magneto-optical disk unit 24.

Therefore, when a command for confirming the disk ID of the magneto-optical disk loaded in the disk unit 24 is transmitted from the still picture file controller 40, then the disk IDS of all of the entire magneto-optical disks loaded in the first through third magneto-optical disk units 24-26 can be detected to thereby enable the still picture file controller 40 to regard as if three magneto-optical disks are loaded in the disk unit 24.

Then the still picture file controller 40 detects that one of the magneto-optical disk units 24, 60 has loaded therein magneto-optical disk with the disk ID designated by the controller 37 ed, and supplies the still picture data DTST together with write commands to the relevant magneto-optical disk units 24, 60 via the MOI/F board, whereby the still picture data DTST are stored on the desired magneto-optical disks with the picture ID designated by the director, and thus a still picture file is formed.

Substantially at the same time as the above, the director accesses the work station 20 by means of the controller 61 and the switcher console panel 62 in the program control room 6, whereby the still picture data $DT_{ST}$ stored on the predetermined magneto-optical disk is read out therefrom through the still picture file controller 40 in accordance with the prepared play list.

Accordingly a still picture index image is formed, and then a video signal $VD_{IDX}$ for the still picture index image is transmitted to the still picture monitor 63 so that the still picture index image is displayed thereon.

In case there exists any incomplete still picture data $DT_{ST}$ in the play list, the position of the still picture index image relative to such still picture data $DT_{ST}$ is displayed by a black level on the still picture monitor 63, thereby enabling the director to grasp it with facility.

At the time of an actual news program broadcast in such a state, the director depresses a take button of the controller 61 while visually confirming the still picture index image on the still picture monitor 63. Then a send command indicative of transmission of a still picture is transmitted by each depression of the button to both the still picture file controller 40 and the switcher 41, whereby the still picture data $DT_{ST}$ are read out sequentially in accordance with the play list and are transmitted in conformity to the switching modes such as wipe, dissolve and so forth designated sequentially in the play list.

In the still picture filing apparatus 1 mentioned above, the still picture file controller 40 and the magneto-optical disk units 24, 60 are mutually connected by means of a coaxial cable, and still pictures are transferred therebetween in the form of digital component video signal baaed on the SMPTE D-1 format, whereby the distance between the still picture file controller 40 and the magneto-optical disk units 24, 60 can be increased up to a practical maximum of 300 meters or so.

Thus, it becomes possible to install the magneto-optical disk units 24, 60 in the director room 2 or the program control room 6 located distant from the machine room 4 where the still picture file controller 40 is disposed, hence enabling the director to replace the magneto-optical disks at hand.

Due to the above constitution where the picture former 35 for preparing still pictures and the work station 20 for preparing a play list indicative of the still picture transmission sequence are provided individually, it becomes possible to set the still picture transmission sequence without the necessity of waiting for completion of the still picture preparation, hence promoting the operational facility of the still picture filing apparatus and achieving remarkable enhancement in the usability thereof.

The above embodiment represents an exemplary case of preparing still pictures merely by the picture former disposed in the still picture preparation room. However, the present invention is not limited to such example alone, and a plurality of picture formers may be provided and driven in parallel to prepare still pictures simultaneously in response to instructions from a director.

In the above embodiment, there are employed a television camera, a VTR, a character generator and a magneto-optical disk unit as video input appliances for preparation of still pictures. However, the present invention is not limited to such example alone, and the same effect as in the above embodiment can be attained by using some other input means such as an optical disk unit or an image reader.

Although in the above embodiment a magneto-optical disk is loaded in a magneto-optical disk unit, it is also possible to employ a magneto-optical disk unit equipped with an automatic disk changer.

Furthermore, in addition to the above embodiment where a magneto-optical disk unit is used as a large-capacity memory means for storing still picture thereon, the present invention may be so modified as to employ a recording/playback unit using a different recording medium such as a magnetic disk, an optical disk or the like. And the same effect as in the above embodiment is attainable even in such a modification.

Besides the above embodiment representing an exemplary case of applying the still picture filing apparatus of the present invention to a news program, it is further possible to apply the present invention widely to production of any of various commercial programs and so forth.

In the constitution described above, the still picture file controller 40 and the magneto-optical disk units 24, 60 are mutually connected by means of a coaxial cable, and each of the still pictures is transferred therebetween in the form of digital component video signal based on the SMPTE D-1 format. Consequently the maximum allowable distance of connection between the still picture file controller 40 and the magneto-optical disk units 24, 60 can be remarkably extended to further enhance the usability of the still picture filing apparatus 1.

The above embodiment represents an exemplary case where the distance between the still picture file controller 40 and the magneto-optical disk units 24, 60 connected mutually by means of a coaxial cable is increased up to a maximum of 300 meters or so. In addition thereto, if a predetermined amplifier is inserted in the coaxial cable, the allowable distance can further be extended to eventually attain remarkably enhanced usability.

Also in the above embodiment, two magneto-optical disk units 25 and 26 are connected via SCSI extension buses SC1 and SC2 to the magneto-optical disk unit 24, and the disk identification data ID of the magneto-optical disks loaded in the two disk units 25 and 26 are retained under control of the magneto-optical disk unit 24. Therefore, the still picture file controller 40 is rendered capable of accessing each magneto-optical disk similarly as in a state where three magneto-optical disks are loaded in the disk unit 24 connected to the MOI/F board, whereby accessible magneto-optical disks can be numerically increased without the necessity of changing the still picture file controller 40 itself. As a result, the still picture filing apparatus can be improved as a whole wherein both the extendability and the usability are remarkably enhanced.

The embodiment mentioned represents an exemplary case where the magneto-optical disk units are cascade-connected via SCSI extension buses to the magneto-optical disk unit connected to the still picture file controller. However, the present invention is not limited to such example alone, and it may be so modified that a maximum of five magneto-optical disk unit are cascade-connected in accordance with the standard of the SCSI extension bus.

Although in the above embodiment a plurality of magneto-optical disk units are cascade-connected via SCSI extension buses, the present invention is not limited merely to such example where SCSI extension buses are employed, and a similar effect is attainable also in a modification using some other interface means for connection of disk units.

In such modification, a magneto-optical disk controller may be provided as a still picture memory control means while the magneto-optical disk units are not connected directly to the still picture file controller, and magneto-optical disks loaded in the plural disk units are retained under control of such still picture file controller.

According to the present invention, as described hereinabove, a still picture preparation means for preparing still pictures and a send list preparation means indicative of a still picture transmission sequence are provided independently, so that the still picture transmission sequence can be set without the necessity of waiting for completion of the still picture preparation, hence realizing an improved still picture filing apparatus where the usability is remarkably enhanced.

Also according to the present invention, a digital component video signal of the SMPTE D-1 format is transferred between the still picture memory means and the still picture storage control means, so that the maximum allowable distance of connection between the still picture storage control means and the still picture memory means can be remarkably extended to consequently realize notable enhancement in the usability of the still picture filing apparatus.

Further according to the present invention, a plurality of still picture memory means for storing still pictures therein are cascade-connected mutually, and the still picture memory control means connected to one still picture memory means is further connected to the still picture storage control means, wherein a desired still picture is read out from the still picture memory means in accordance with the read signal supplied from the still picture storage control means to the still picture memory control means. Therefore the still picture memory means can be extended without increasing the load of the still picture storage control means, hence attaining remarkable enhancement in the usability of the still picture filing apparatus.

Figure 2:
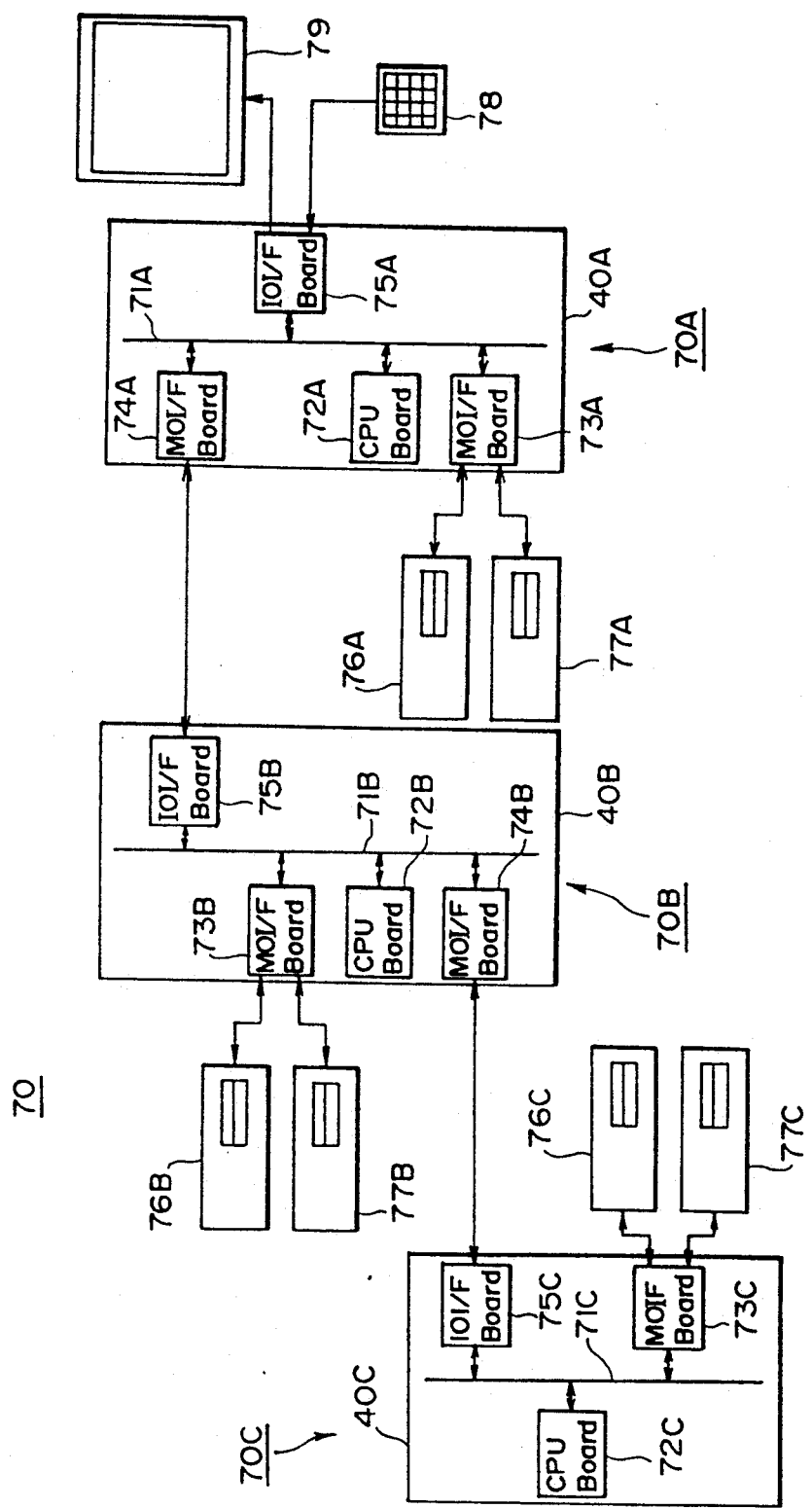
FIG. 2 is a block diagram showing a second embodiment of the still picture filing apparatus of the present invention.

Denoted by 70 in FIG. 2 is a still picture filing system where a plurality of the above-described still picture filing apparatus are connected. In this example, the system 70 consists of three still picture filing apparatus 70A, 70B and 70C.

A CPU board 72A, first and second MOI/F boards 73A, 74A and an IOI/F board 75A are connected to a video bus 71A in a still picture filing controller 40A of the first still picture filing apparatus 70A. Practically two magneto-optical disk units 76A, 77A are connected to the first MOI/F board 73A, and both a controller 78 and a monitor 79 are connected to the IOI/F board 75A.

Similarly a CPU board 72B, first and second MOI/F boards 73B, 74B and an IOI/F board 75B are connected to a video bus 71B in a still picture file controller 40B of the second still picture filing apparatus 70B. Practically two magneto-optical disk units 76B, 77B are connected to the first MOI/F board 73B.

Further a CPU board 72C, an MOI/F board 73C and an IOI/F board 75C are connected to a video bus 71C in a still picture file controller 40 of the third still picture filing apparatus 70C. Practically two magneto-optical disk units 76C, 77C are connected to the MOI/F board 73C.

In this embodiment, the second MOI/F board 74A in the still picture file controller 40A of the first still picture filing apparatus 70A and the IOI/F board 75B in the still picture file controller 40B of the second still picture filing apparatus 70B are connected to each other via a coaxial cable and a signal line based on the RS-422 interface standard In addition, the second MOI/F board 74B in the still picture file controller 40B of the second still picture filing apparatus 70B and the IOI/F board 75C in the still picture file controller 40C of the third still picture filing apparatus 70C are connected to each other via a coaxial cable and a signal line based on the RS-422 interface standard.

In the still picture filing system 70 of this embodiment, the MOI/F boards 74A, 74B and the IOI/F boards 75B, 75C incorporate common protocols therein so that the still picture file controllers 40A, 40B, 40C in the still picture filing apparatus 70A, 70B, 70C can be cascade-connected to one another.

Each of CPUs on the CPU boards 72A, 72B, 72C in the still picture file controllers 40A, 40B, 40C in this embodiment transmits a command at a predetermined time interval so as to confirm the disk ID of the magneto-optical disks loaded in the disk units 76A, 77A, 76B, 77B, 76C, 77C connected directly to the MOI/F boards 73A, 74A, 73B, 74B, 74C, and the disk ID obtained as a result can be retained in the CPUs during the succeeding time interval.

Suppose now that, in the constitution mentioned above, magneto-optical disks with disk identification data of ID=1, ID=2, ID=3, ID=4, ID=5 and ID=6 are loaded in the magneto-optical disk units 76A, 77A, 76B, 76C and 77C respectively.

In such a state, when the director manipulates the controller 78 to send a read command for reading out the still picture from the magneto-optical disk with the disk ID=5 and the picture ID=1, then the CPU in the first still picture file controller 40A makes a decision as to whether the content of such read command is coincident or not with the stored disk ID (i.e., ID=1 and ID=2), and detects a non-coincidence in this exemplary case.

Therefore the CPU in the first still picture file controller 40A transmits the input read command to the IOI/F board 75B of the second still picture file controller 40B via the MOI/F board 74A.

Subsequently the CPU in the second still picture file controller 40B makes a decision as to whether the content of such read command is coincident or not with the stored disk ID (i.e., ID=3 and ID=4). And upon detection of a non-coincidence, the CPU in the second still picture file controller 40B transmits the input read command via the MOI/F board 7fB to the IOI/F board of the third still picture file controller 40C.

As a result, the CPU in the third still picture file controller 40C makes a decision as to whether the content of the read command is coincident or not with the data ID (i.e., ID=5 and ID=6) stored therein and, upon detection of a coincidence, transmits a read command for reading out the still picture, which has the picture identification data ID=1, to the magneto-optical disk unit 76C where the magneto-optical disk with the disk identification data ID (=5) represented by the input read command is loaded.

The still picture data thus read out is then supplied to the monitor 79 via the MOI/F board 73C and the IOI/F board 75C of the third still picture file controller 40C, the MOI/F board 74B and the IOI/F board 75B of the second still picture controller 40B, and the MOI/F board 74A and the IOI/F board 75A of the first still picture file controller 40A, whereby the still picture is displayed on the monitor 79.

Therefore in the still picture filing system 70, a desired still picture on the magneto-optical disk loaded in any of the disk units 76B, 77B, 76C, 77C connected to the still picture file controllers 40B and 40C of the second and third still picture filing apparatus 70B and 70C can be read out merely by operating the controller 78 of the still picture filing apparatus 70A to designate the disk ID and the picture ID, similarly to the magneto-optical disk units 76A and 77A connected to the still picture file controller 40A of the first still picture filing apparatus 70A.

According to the above constitution where three still picture filing apparatus 70A, 70B, 70C are cascade-connected mutually, it becomes possible that, with regard to any one of the still picture filing apparatus 70A–70C, a desired still picture on the magneto-optical disk loaded in the disk unit 76A–76C, 77A–77C connected to any other of the still picture filing apparatus 70A–70C is readable similarly to the still picture on the magneto-optical disk loaded in the disk unit 76A–76C, 77A–77C connected to such one of the still picture filing apparatus 70A–70C. Consequently, the usability can be sufficiently enhanced in the still picture filing system 70.

The embodiment described above represents an exemplary case where three still picture filing apparatus are cascade-connected to one another. However, it is to be understood that the present invention is not limited to such example alone. And when necessary, any adequate number of still picture filing apparatus may be cascade-connected mutually to achieve the same effect as the aforementioned.

Although in the above embodiment each still picture filing apparatus is composed of magneto-optical disk units, a controller and a monitor connected to a still picture file controller, the constitution of the individual still picture filing apparatus is not limited to such example alone, and the arrangement shown in FIG. 1 may also be employed to achieve the same effect as in the above embodiment.

Also in the above embodiment, two magneto-optical disk units are connected to each of the still picture filing apparatus. However, the number of such disk units is not limited merely to the example, and the same effect as in the above embodiment is still attainable by connecting more than two magneto-optical disk units with a numerical increase of the internal MOI/F boards.

Further in the above embodiment, a magneto-optical disk unit is employed as a large-capacity memory means for storing a still picture thereon. However, the present invention is not limited thereto alone, and the same effect as in the embodiment is also attainable by employing a recording/playback unit which uses a different recording medium such as a magnetic disk or an optical disk.

Besides the above embodiment representing an exemplary case of applying the still picture filing system of the present invention to a news program, it is further possible to apply the present invention widely to production of any of various commercial programs and so forth.

According to the present invention, as described hereinabove, still picture storage control means of a plurality of still picture filing apparatus are cascade-connected to one another via interface means so that, in accordance with a read signal inputted to the still picture storage control means of any one still picture filing apparatus, a desired still picture can be read out from the still picture memory means connected to the still picture storage control means of such one or other still picture filing apparatus, whereby both the extendability and usability of the still picture filing system can be remarkably enhanced.

Figure 3:
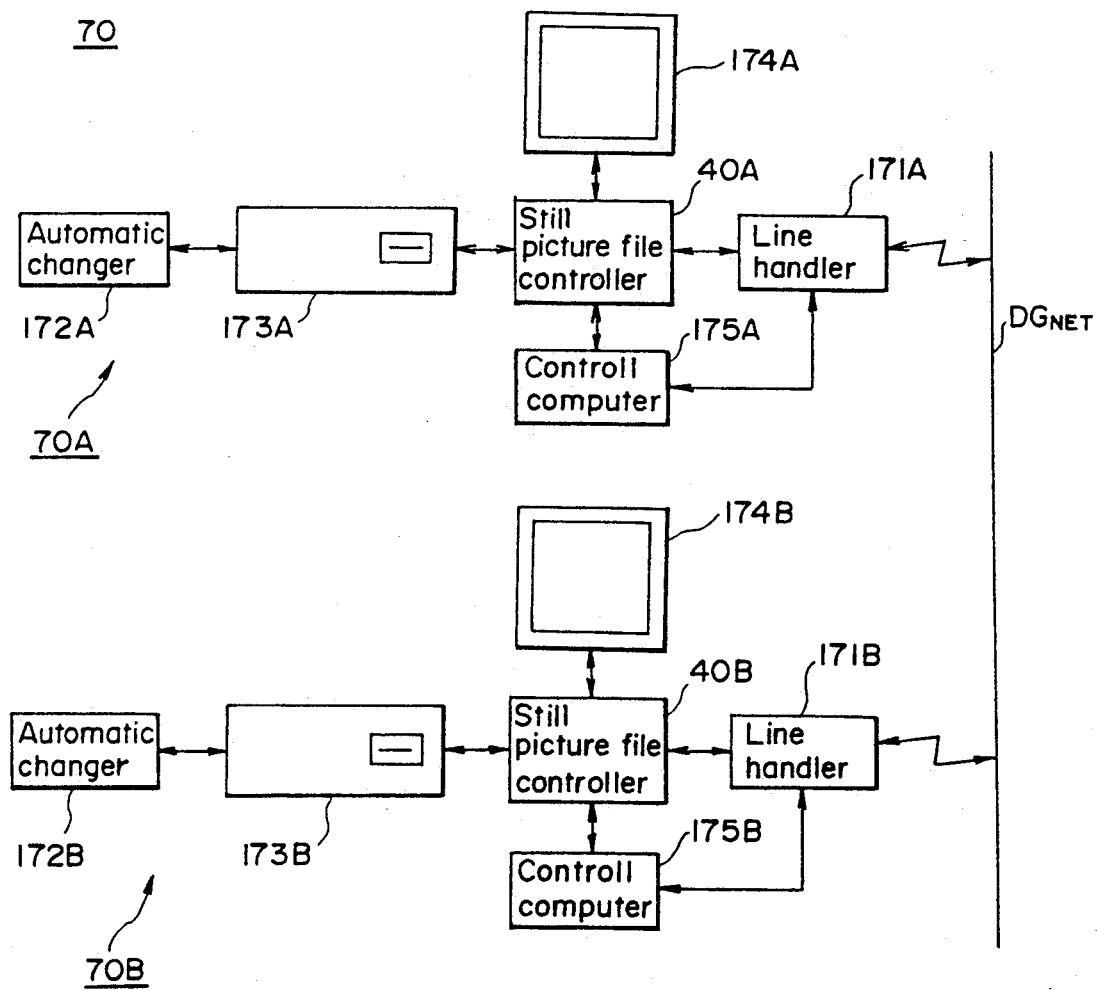
FIG. 3 is a block diagram showing a third embodiment of the still picture filing apparatus of the present invention.

In FIG. 3 where the same reference numerals and symbols as those used in FIG. 1 denote the same or corresponding components, there is shown a still picture filing system 70 embodying the present invention. In this system 70, a plurality of still picture filing apparatus 70A, 70B, ... are connected to a high-speed digital network $DG_{NET}$ via line handlers 71A, 71B, ... connected respectively to internal still picture file controllers 40A, 40B, ... and so forth.

To such still picture file controllers 40A, 40B, ... in the still picture filing apparatus 70A, 70B, ..., there are connected magneto-optical disk units 173A, 173B, ... with automatic changers 172A, 172B, ..., monitors 174A, 174B, ... and control computers 175A, 175B, ... and so forth.

In the still picture file controllers 40A, 40B, ..., the line handlers 171A, 171B, ... are connected to an IOI/F board, while the magneto-optical disk units 173A, 173B, ... are connected to an MOI/F board.

In the control computers 175A, 175B, ... are stored dial numbers and so forth of the still picture filing apparatus 70A, 70B, ... connected to one another, and when the line handlers 171A, 171B, ... are controlled by a director for example, communication lines are established among the still picture filing apparatus 70A, 70B, ... for executing transfer of still pictures.

The line handlers 171A, 171B, ... incorporate predetermined communication control routines and image compression-expansion circuits, so that still picture data inputted from the still picture file controllers 49A, 40B, ... are image-compressed and transmitted to the high-speed digital network $DG_{NET}$, or compressed still picture data received from the high-speed digital network $DG_{NET}$ are image-expanded and transmitted to the still picture file controllers 40A, 40B, ... and so forth.

In the constitution mentioned, when still picture information such as a photograph for preparing a still picture to be used in a news program is hardly available, a director, who is in charge of the news program broadcasting section where the first still picture filing apparatus 70A for example is installed, manipulates the control computer 175A to call the mutually connected still picture filing apparatus 70B, ... through the high-speed digital network DG$_{NET}$, thereby establishing communication lines among the still picture filing apparatus 70B, ... and so forth sequentially in the high-speed digital network DG$_{NET}$.

And a search command for request of detecting the presence or absence of a desired still picture is transmitted by the director to the still picture filing apparatus 70B, ... and so forth among which the communication lines are established.

When it has been detected in such a state that the desired still picture is existent on the magneto-optical disk loaded in the disk unit 173B of the second still picture filing apparatus 70B, the director first manipulates the control computer 75A to call the still picture filing apparatus 70B, thereby establishing a communication line in the high-speed digital network DG$_{NET}$.

Subsequently the director manipulates the control computer 175A to transmit a read command inclusive of disk ID and picture ID to the second still picture filing apparatus 70B for reading out the desired still picture from the magneto-optical disk loaded in the disk unit 173B.

Then the second still picture filing apparatus 70B reads out the still picture, which conforms with the disk ID and the picture ID represented by the input read command, from the magneto-optical disk unit 173B and transmits such still picture through the high-speed digital network DG$_{NET}$ to the first still picture filing apparatus 70A.

Thereafter the first still picture filing apparatus 70A adds predetermined disk ID and picture ID to the still picture received from the second still picture filing apparatus 70B, and then writes the still picture on the magneto-optical disk loaded in the disk unit 173A and conforming with the disk ID, whereby such still picture is rendered utilizable as the information required for preparing a still picture to be used in the news program, as described with regard to FIG. 1.

According to the above constitution, even when the still picture filing apparatus 70A, 70B, ... are installed in a plurality of broadcasting stations, it is possible to search or read any of the still picture files stored on the magneto-optical disks among the still picture filing apparatus 70A, 70B, ... and so forth, since the still picture filing apparatus 70A, 70B, ... are mutually connected through the high-speed digital network DG$_{NET}$ by way of the line handlers 171A, 171B, ... connected respectively to the internal still picture file controllers 40A, 40B, ... and so forth. Consequently, remarkable enhancement is achieved in the usability of the still picture filing system 70.

Figure 4:
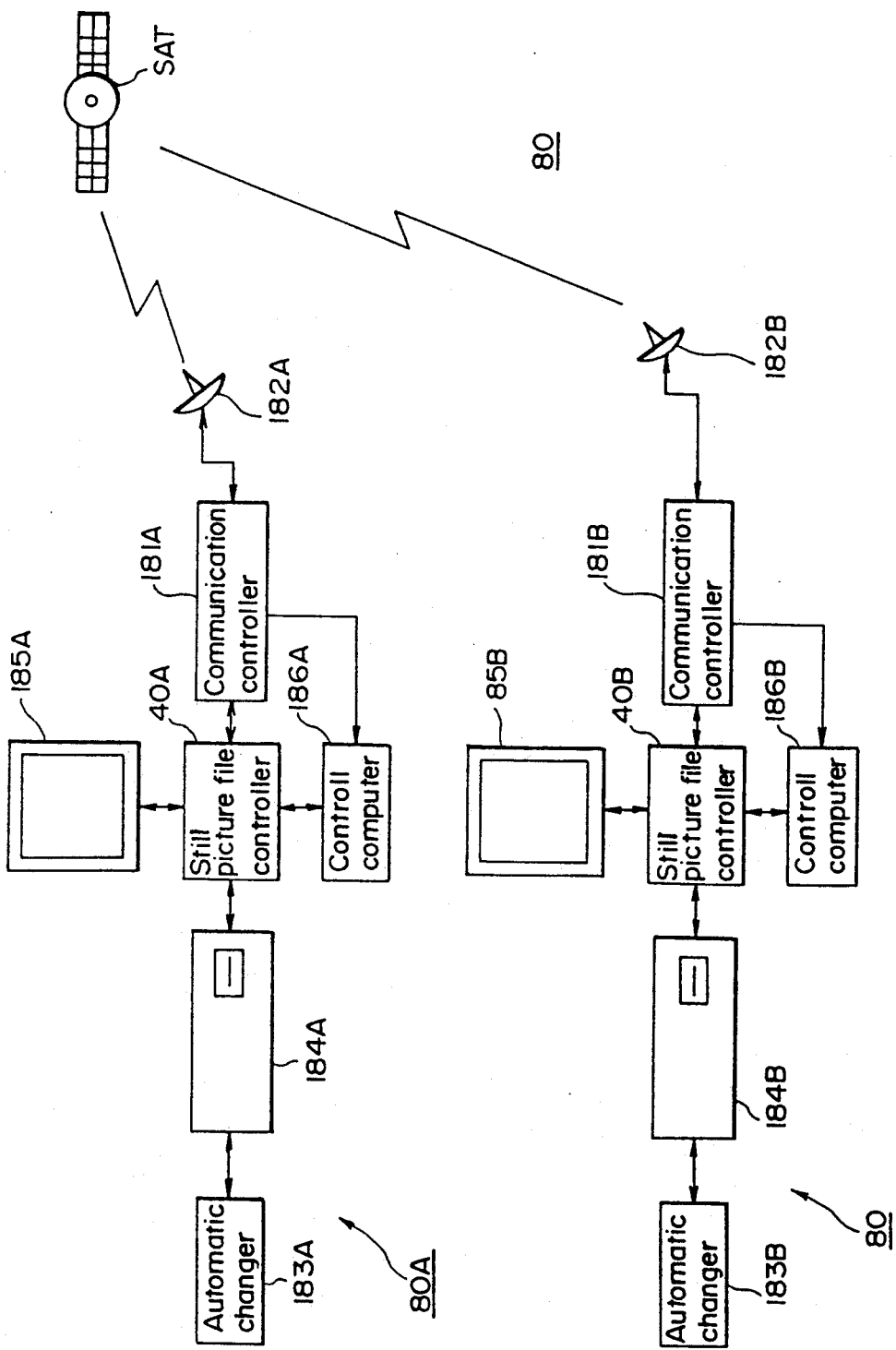
FIG. 4 is a block diagram showing a fourth embodiment of the still picture filing apparatus of the present invention.

In FIG. 4 where the same reference numerals and symbols as those used in FIG. 3 denote the same or corresponding components, there is shown a still picture filing system 80 of the present invention. In this system 80, a plurality of still picture filing apparatus 80A, 80B, ... are connected to antennas 182A, 182B, ... respectively via communication controllers 181A, 181B, ... which are connected respectively to internal still picture file controllers 40A, 40B, ..., whereby the plural still picture filing apparatus 80A, 80B, ... are mutually connected through a satellite communication network by way of a communication satellite SAT.

To such still picture file controllers 40A, 40B, ... in the still picture filing apparatus 80A, 80B, ..., there are connected magneto-optical disk units 184A, 184B, ... with automatic changers 183A, 183B, ..., monitors 185A, 185B, ... and control computers 186A, 186B, ... and so forth.

In the still picture file controllers 40A, 40B, ... the communication controllers 181A, 181B, ... are connected to an IOI/F board, while the magneto-optical disk units 184A, 184B, ... are connected to an MOI/F board.

In the control computers 186A, 186B, ... are stored dial numbers and so forth of the still picture filing apparatus 89A, 80B, ... connected to one another. And when the communication controllers 181A, 181B, ... are manipulated by the director for example, satellite communication lines are established among the still picture filing apparatus 80A, 80B, ... for executing transfer of still pictures.

The communication controllers 181A, 181B, ... incorporate predetermined communication control routines and image compression-expansion circuits, so that still picture data inputted from the still picture file controllers 40A, 40B, ... are image-compressed and modulated by a predetermined modulation method and then are outputted to the antennas 182A, 182B, ...; while the input signals received at the antennas 182A, 182B, ... are demodulated and image-expanded to obtain still picture data, which are then outputted to the still picture file controllers 40A, 40B, ... and so forth.

According to the constitution mentioned, even if the still picture filing apparatus 80A, 80B, ... are installed in a plurality of broadcasting stations all over the world for example, it is possible to search or read any of the still picture files stored on the magneto-optical disks among the plural still picture filing apparatus 80A, 80B, ... and so forth, since the still picture filing apparatus 80A, 80B, ... are connected to the satellite communication network with the communication satellite SAT by way of the antennas 182A, 182B, ... and the communication controllers 181A, 181B, ... connected respectively to the internal still picture file controllers 40A, 40B, ... and so forth.

Therefore, connection is rendered possible for transfer of still pictures even when the still picture filing apparatus 80A, 80B, ... are installed dispersedly in a wider area as compared with the aforementioned case of connecting the apparatus through the high-speed digital network DG$_{NET}$, hence achieving further enhancement in the usability of the still picture filing system 80.

The embodiment described above represents an exemplary case where the magneto-optical disk unit connected to the still picture file controller 40 is equipped with an automatic changer. However, it is to be understood that the present invention is not limited to such example alone. And the same effect as in the above embodiment can be attained also in an arrangement where a plurality of magneto-optical disk units are connected to the still picture file controller 40.

Although in the above embodiment each still picture filing apparatus is composed of a monitor, a magneto-optical disk unit, a control computer and a line handler or a communication controller connected to a still picture file controller, the constitution of the individual still picture filing apparatus is not limited merely to such example, and the arrangement shown in FIG. 1 may also be employed to achieve the same effect as in the above embodiment.

Also in the above embodiment, a plurality of still picture filing apparatus are mutually connected through a high-speed digital network used as a wire network.

However, the present invention is not limited thereto alone, and telephone lines may also be used for connection of the apparatus.

Such modification may be so constituted that an analog video signal is transmitted from each still picture file controller, and a modem may be employed in place of the line handler.

In the above embodiment, a plurality of still picture apparatus are mutually connected through a satellite communication network used as a wireless network with a communication satellite. However, the present invention is not limited thereto alone, and such connection may be realized by the use of a ground wireless network with microwave channels or the like.

Further in the above embodiment, a magneto-optical disk unit is employed as a large-capacity memory means for storing a still picture thereon. However, the present invention is not limited thereto alone, and the same effect as in the above embodiment is also attainable by employing a recording/playback unit which uses a differential recording medium such as a magnetic disk or an optical disk.

Besides the above embodiment representing an exemplary case of applying the still picture filing system of the present invention to a news program, it is further possible to apply the present invention widely to production of any of various commercial program and so forth.

According to the present invention, as described hereinabove, a transfer means is provided in each of plural still picture filing apparatus, and still picture storage control means of such still picture filing apparatus are mutually connected through a wire network by way of the transfer control means, whereby still pictures can be transferred among the plural still picture apparatus.

Further according to the present invention, a transmission-reception control means is provided in each of plural still picture filing apparatus, and still picture storage control means of such still picture filing apparatus are mutually connected through a wireless network by way of the transmission-reception control means, whereby still pictures can be transmitted and received among the plural still picture filing apparatus.

Thus, it becomes possible to accomplish an improved still picture filing system which is sufficiently enhanced in the usability.

Figure 5:
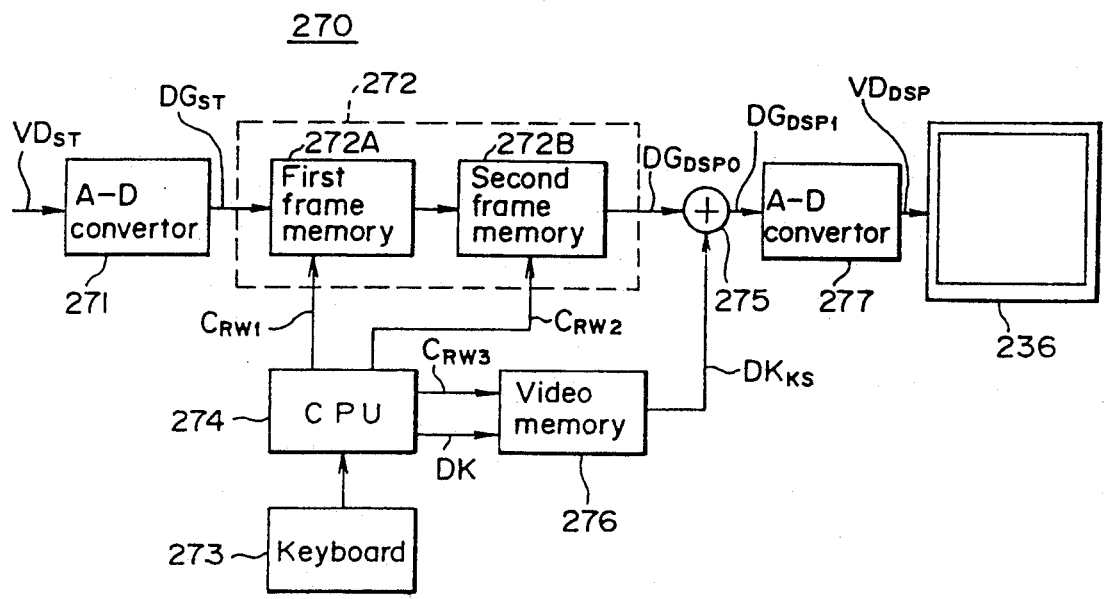
FIG. 5 is a block diagram showing an exemplary embodiment of a picture display device used in the still picture filing apparatus of FIG. 1.

In FIG. 5 where the same reference numerals and symbols as those used in FIG. 1 denote the same or corresponding components, there is shown a picture display device 270 employed as the picture former 35 in the still picture filing apparatus 1.

Practically in the picture display device 270, a video signal $VD_{ST}$ selected through the switcher 34 as mentioned is inputted to an analog-to-digital converter 271, and a digital video signal $DG_{ST}$ obtained as a result is inputted to a picture processing circuit 272 having first and second frame memories 272A and 272B.

One frame of the digital video signal $DG_{ST}$ written in the first frame memory 272A of the picture processing circuit 272 is read out in accordance with a first write-/read control signal $C_{RW1}$ obtained from a CPU 274 in response to a command inputted from a keyboard 273 manipulated by the still picture preparation operator. And after execution of a predetermined image process such as size reduction, enlargement, displacement, superimposition or the like, the signal read out is written in the second frame memory 72B in accordance with a second write/read control signal $C_{RE2}$ obtained similarly from the CPU 274.

Thereafter the content of the second frame memory 272B is read out at a predetermined timing and then is inputted as an image-processed digital video signal $DG_{DSP0}$ to a picture synthesizer 275.

In this embodiment, the CPU 274 generates figure data DK for a cursor frame KSW or a cursor KS and supplies such data DK together with a third write/read control signal $C_{RW3}$ to a video memory 276, whereby the figure data DK is written in the video memory 276. And cursor data $DG_{KS}$ obtained as a result is inputted to the picture synthesizer 275.

Practically the picture synthesizer 275 combines the cursor data $DG_{KS}$ with the image-processed digital video signal DG by the technique of superimposition or the like, and the digital video signal $DG_{DSP1}$ obtained as a result is inputted to a monitor 236 after being converted into a video signal VDDSP through a digital-to-analog converter 277.

Thus, a cursor frame KSW or a cursor KS corresponding to the figure data DK is superimposed on the still picture PIC being displayed on the screen DSP0 or DSP1 (FIG. 7 or 8) of the monitor 236.

Figure 6:
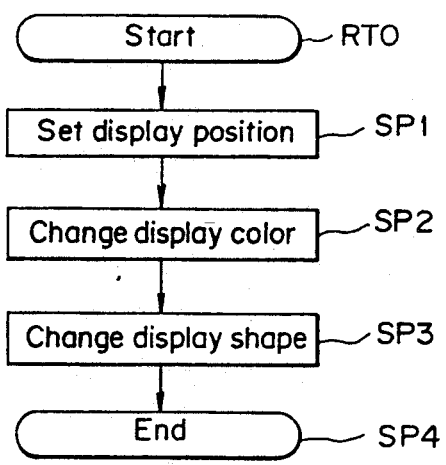
FIG. 6 is a flow chart of a processing routine relative to the operation of the picture display device shown in FIG. 5.

When the CPU 274 generates figure data DK, execution of an image display processing routine RT0 is started, as shown in FIG. 6, in response to a command inputted from the keyboard 273 by the still picture preparation operator. In step SP1, coordinate data inputted numerically from the keyboard 273 and also an arrow key input are detected to set a display position of the figure data DK for cursor data.

Subsequently the CPU 274 proceeds to step SP2, where the display color of the figure data DK is sequentially changed under control to white, red, blue, yellow and so forth at a predetermined time interval (e.g., one second).

Thereafter the CPU 274 proceeds to step SP3, where the display shape of the figure data DK is sequentially changed under control to +, x, o and so forth at a predetermined time interval (e.g., one second). And finally in step SP4, the routine RT0 for processing the image display on the screen is terminated.

In this embodiment, the CPU 274 automatically selects, in accordance with the kind of the figure data DK for the cursor data, either the execution of step SP2 alone for controlledly changing merely the display color of the figure data DK or the execution of both steps SP2 and SP3 for controlledly changing the display color and shape of the figure data DK.

Figure 7A:
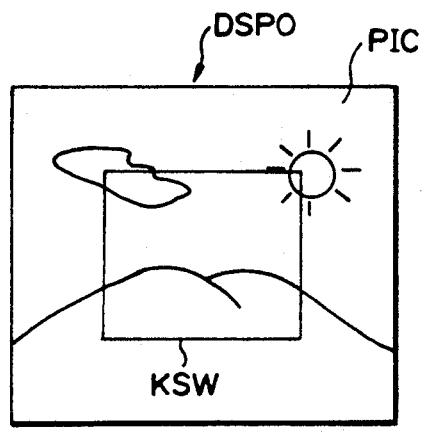
FIG. 7 schematically illustrates a cursor frame displayed on a monitor of the picture display device shown in FIG. 5.
Figure 7B:
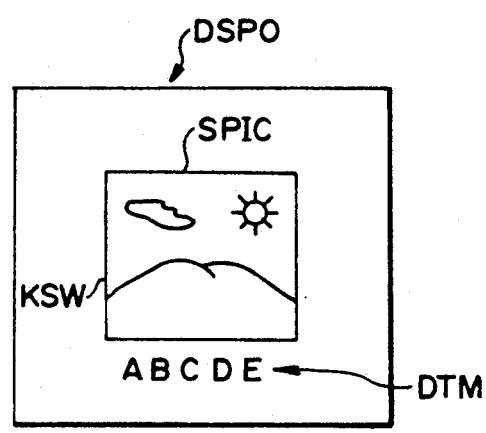
Figure 8:
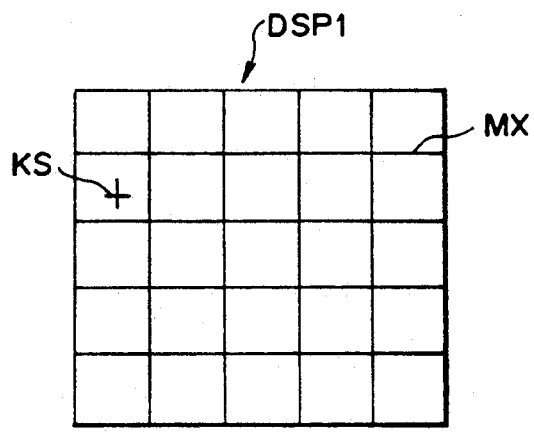
FIG. 8 schematically illustrates a cursow displayed on a monitor of the picture display device shown in FIG. 5.

In case the figure data DK is the cursor data representing a cursor frame KSW as described with reference to FIG. 7, the CPU 274 practically changes under control merely the display color of the figure data DK. Meanwhile in case the figure data DK is the cursor data representing a cursor KS as described with reference to FIG. 8, the CPU 274 changes under control both the display color and the display shape of the figure data DK.

Due to such arrangement, when the cursor frame KSW is superimposed on the still picture PIC being displaced on the screen DSP0, the display color of the cursor frame KSW is sequentially changed to white, red, blue, yellow and so forth at a time interval of one second, so that regardless of the background color of the still picture PIC, the cursor frame RSW can always be perceived well with satisfactory visual distinction.

Furthermore, when the cursor KS is superimposed on the lattice background MX being displayed on the screen DSP1, the display color of the cursor KS is changed to white, red, blue, yellow and so forth at a time interval of one second, and simultaneously the display shape of the cursor KS is sequentially changed to +, x, o and so forth at a time interval of one second, whereby the displayed cursor KS can always be perceived well with satisfactory visual distinction.

Thus, according to the constitution mentioned above, the display color or shape of the cursor data on the screen is sequentially changed under control at a predetermined time interval so that, regardless of any color or shape of the background being displayed on the screen, the cursor data can be visually represented with high distinction to consequently realize an improved picture display device where the perceptibility of the cursor data is remarkably enhanced.

In the above embodiment, the display color of the cursor data is sequentially changed to white, red, blue and yellow at a predetermined time interval. However, the display colors and the number thereof are not limited to such examples alone and may be selectively set to any adequate ones.

Similarly the display shapes of the cursor data and the number thereof are not limited to those described in the above embodiment where the display shape is sequentially changed to +, x and o at a predetermined time interval, and any of adequate shapes and numbers may be selected.

In addition to the above embodiment where the display color and shape of the cursor data are sequentially changed, a similar effect is also attainable by sequentially changing the display shape alone of the cursor.

Besides the above embodiment where the display color and/or the display shape of the cursor is changed automatically and sequentially, it may be so modified as to designate selection of automatic display by manipulating the keyboard or the like. In this modification, the extendability can further be enhanced.

The above embodiment represents an exemplary case of applying the picture display device of the present invention to a picture former in a still picture filing apparatus. However, the present invention is not limited to such example alone, and it may be used widely as a picture display device for computer graphics or CAD/CAM (computer aided design/computer aided manufacturing).

According to the present invention, as described hereinabove, the color information and/or the shape information of cursor data is sequentially changed at a predetermined time interval and is superimposed on an input picture signal being displayed, so that the cursor data can be displayed distinctly despite various color and shape information of the input picture signal.

Consequently it becomes possible to realize an improved picture display device where operational facility thereof is rendered superior due to remarkable enhancement of the visual perceptibility of the cursor data.

What is claimed is:

1. A still picture filing apparatus comprising:
   a) means for generating a plurality of still picture identification data, each comprised of a disk identification data and a picture content identification data;
   b) still picture preparation means for receiving the plurality of still picture identification data and preparing a corresponding plurality of independently occurring still pictures from a plurality of sources, and outputting still picture video data along with corresponding still picture identification data;
   c) still picture memory means supplied with the still picture video data and the corresponding still picture identification data for storing the plural still pictures along with the corresponding still picture identification data added thereto, on memory disks in accordance with the disk identification data;
   d) still-picture play list means for selectively preparing play list data indicative of a still picture transmission sequence by reference to the still picture identification data;
   e) transmission command signal generation means for generating a transmission command signal to instruct transmission of the still pictures according to the play list data; and
   f) control means responsive to the transmission command signal outputted from the transmission command signal generation means for reading out the still pictures from the still picture memory means in conformity to the transmission sequence indicated by the play list data.

2. A still picture filing apparatus according to claim 1, wherein said still picture memory means and said control means mutually transfer the video signal therebetween in a signal form based on the D-1 format of a digital video tape recorder.

3. A still picture filing apparatus according to claim 2, wherein said still picture memory means comprises a plurality of cascade-connected magneto-optical disk units and a disk controller for controlling said magneto-optical disk units; and said disk controller reads out the still picture from the magneto-optical disk unit conforming with a read signal supplied from said control means.

4. A still picture filing apparatus according to claim 1 further comprising:
   a) second still picture preparation means for receiving the plurality of still picture identification data and also preparing a plurality of independently occurring still pictures from a plurality of sources, generating corresponding still picture identification data for each of such still pictures, and also outputting still picture video data along with the corresponding still picture identification data;
   b) second still picture memory means supplied with the still picture video data and the corresponding still picture identification data for storing the plural still pictures along with the corresponding still picture identification data added thereto;
   c) second still-picture play list means for preparing second play list data indicative of a still picture transmission sequence by reference to the still picture identification data;
   d) second transmission command signal generation means for generating a transmission command signal to instruct transmission of the still pictures according to the play list data;
   e) second control means connected to said control means in a manner to respond to the transmission command signal outputted from said second transmission command signal generation means for reading out the still picture from said first or second still picture memory means in conformity to the transmission sequence indicated by the second play data.

5. A still picture filing apparatus according to claim 4, further comprising transfer control means for mutually connecting said control means and said second control means via a wire network.

6. A still picture filing apparatus according to claim 5, wherein said wire network is a high-speed digital network.

7. A still picture filing apparatus acording to claim 4, further comprising transmission-reception control means for mutually connecting said control means and said second control means via a wireless network.

8. A still picture filing apparatus according to claim 7, wherein said wireless network is a satellite communication network.

9. A still picture filing apparatus according to claim 1, wherein said still picture preparation means has display means for displaying the still pictures thereon.

10. A still picture filing apparatus according to claim 9, wherein said display means comprises:
- a means for generating cursor data inclusive of both color information and shape information;
- a means for sequentially changing the color information and/or the shape information of said cursor data at a predetermined time interval; and
- a means for synthesizing the still picture and the cursor formed on the basis of said cursor data.

* * * * *